United States Patent [19]

Suzuki

[11] Patent Number: 4,621,407
[45] Date of Patent: Nov. 11, 1986

[54] BODY FOR MACHINING CENTER

[75] Inventor: Yasuhiro Suzuki, Mishima, Japan

[73] Assignee: Fuji Seiki Machine Works, Ltd., Shizuoka, Japan

[21] Appl. No.: 612,931

[22] Filed: May 22, 1984

[30] Foreign Application Priority Data

Jul. 15, 1983 [JP] Japan .......................... 58-108900[U]

[51] Int. Cl.⁴ ........................................... B23Q 3/157
[52] U.S. Cl. ..................................... 29/568; 408/235;
408/35; 409/235; 29/26 A
[58] Field of Search ................. 29/568, 26 A; 408/35,
408/235, 236; 409/235

[56] References Cited

U.S. PATENT DOCUMENTS 3,292,235 12/1966 Riedel .
4,190,938 3/1980 Hillmann ............................ 29/26 A
4,358,888 11/1982 Fankl et al. ............................ 29/568

OTHER PUBLICATIONS pp. 15-63 Through 15-72 of *Tool and Manufacturing Engineers Handbook*, Fourth Edition, vol. 1 Machining, Society of Manufacturing Engineers.

Photocopy of White-Sundstrand Series 20 Vertical Omnimil Brochure.
Copy of White-Sundstrand Brochure Entitled "Series 20 Vertical Omnimil"—1982.

*Primary Examiner*—Z. R. Bilinsky
*Attorney, Agent, or Firm*—Flynn, Thiel, Boutell & Tanis

[57] ABSTRACT

A machining center having an upright boxlike housing which projects upwardly adjacent the rear side of the table through a substantial vertical extent. The housing defines an interior chamber therein in which is positioned a movable support for mounting a plurality of tools. This housing has a pair of sidewalls which, at their front edges, have forwardly projecting protrusions which overhang the table. A slide is mounted on the upper surfaces of the housing and is movable horizontally in perpendicular relationship to the table movement. This slide, on the front end thereof, mounts a tool spindle head for displacement along a vertical axis. The front wall of the boxlike housing has an opening which extends therethrough and projects vertically up through the top wall thereof, so that rearward slidable displacement of the slide permits the spindle head to be moved rearwardly into the interior chamber to provide access to the stored tools.

6 Claims, 10 Drawing Figures

BODY FOR MACHINING CENTER

FIELD OF THE INVENTION

This invention relates to a machining center and, in particular, to an improved body structure therefor.

BACKGROUND OF THE INVENTION

The body of a conventional machining center typically has a configuration which resembles that illustrated by FIG. 1. That is, the machining center has a work table which is supported on a machine base a for horizontal sliding movement along the X axis. The body, in addition to the base a, is also provided with a boxlike base b positioned adjacent the rearward side of the table. This base supports, on the upper end thereof, an upright column B which is slidably supported on the base b for horizontal movement along the Y direction which extends substantially perpendicular to the X direction. A tool spindle head assembly C, which mounts thereon the selected tool, is mounted on the front side of the column B so as to be vertically movable, such as along the axis Z, so that the tool can perform the desired machining operation on a workpiece mounted on the table A.

This conventional arrangement as diagrammatically illustrated by FIG. 1, has proven to require a complex and bulky structure. In addition, this arrangement results in undesirable forces being imposed thereon, specifically on the column B. That is, the upward thrust force imposed on the tool spindle during a cutting operation acts on the spindle head C, which is suspended at one end from the column B in a manner similar to a cantilever beam. Due to this upward thrust force and the cantilever effect, the column B hence has exerted thereon a large counter force which tends to resist the cutting thrust force, this counter force being imposed on the bottom of the column B at the front side thereof. Due to the substantial thrust force and counter force, the structure of the machine base b and column B have to be extremely heavy and massive in order to maintain the necessary high accuracy required by the machining operation. This in turn necessitates that the feeding devices also have a heavy and rugged construction. Further, the sliding surface provided between the column B and the base b is normally disposed in the vicinity of the lower end of the tool spindle, and hence the cutting chips often come into contact with this slidable surface, thereby requiring that the machine be equipped with an appropriate chip removal device to maintain the sliding surfaces free of harmful chips.

Accordingly, it is an object of this invention to provide a machining center, and in particular an improved body structure for a machining center, which improvement overcomes many of the above-mentioned defects as associated with conventional machining centers.

More specifically, according to the present invention, the improved machining center includes an upright boxlike housing structure which projects upwardly adjacent the rear side of the table through a substantial vertical extent. This housing defines an interior chamber therein in which is positioned the movable support for mounting a plurality of tools. The boxlike housing structure has a pair of opposed sidewalls which, at their front edges, have forwardly projecting protrusions which significantly overhang the table. A slide is slidably mounted on the upper surfaces of the housing structure and is movable horizontally in perpendicular relationship to the table movement. This slide, on the front end thereof, mounts a tool spindle head assembly for displacement along a vertical axis, whereupon the spindle head assembly can be positioned directly over the table but can also be moved rearwardly to permit access to the tools stored within the boxlike housing structure. For this purpose, the front wall of the boxlike housing structure has a substantial opening which extends therethrough and projects vertically up through the top wall thereof, so that rearward slidable displacement of the slide permits the spindle head assembly to be moved rearwardly through the opening into the interior chamber to provide access to the stored tools.

With the improved machining center of this invention, and specifically the improved housing structure, the overall machine housing can be of substantially lighter weight, while at the same time providing the necessary ruggedness and precision of machine performance. This arrangement also substantially eliminates the need for additional chip removal systems, except those associated with the table. Further, this arrangement provides substantial space for the tool storage and exchange systems, and at the same time permits tools to be readily accessed to and from this storage system to permit convenience and efficiency of use.

Other objects and purposes of the invention will be apparent to persons familiar with systems of this general type upon reading the following specification and inspecting the accompanying drawings.

Figure 3:
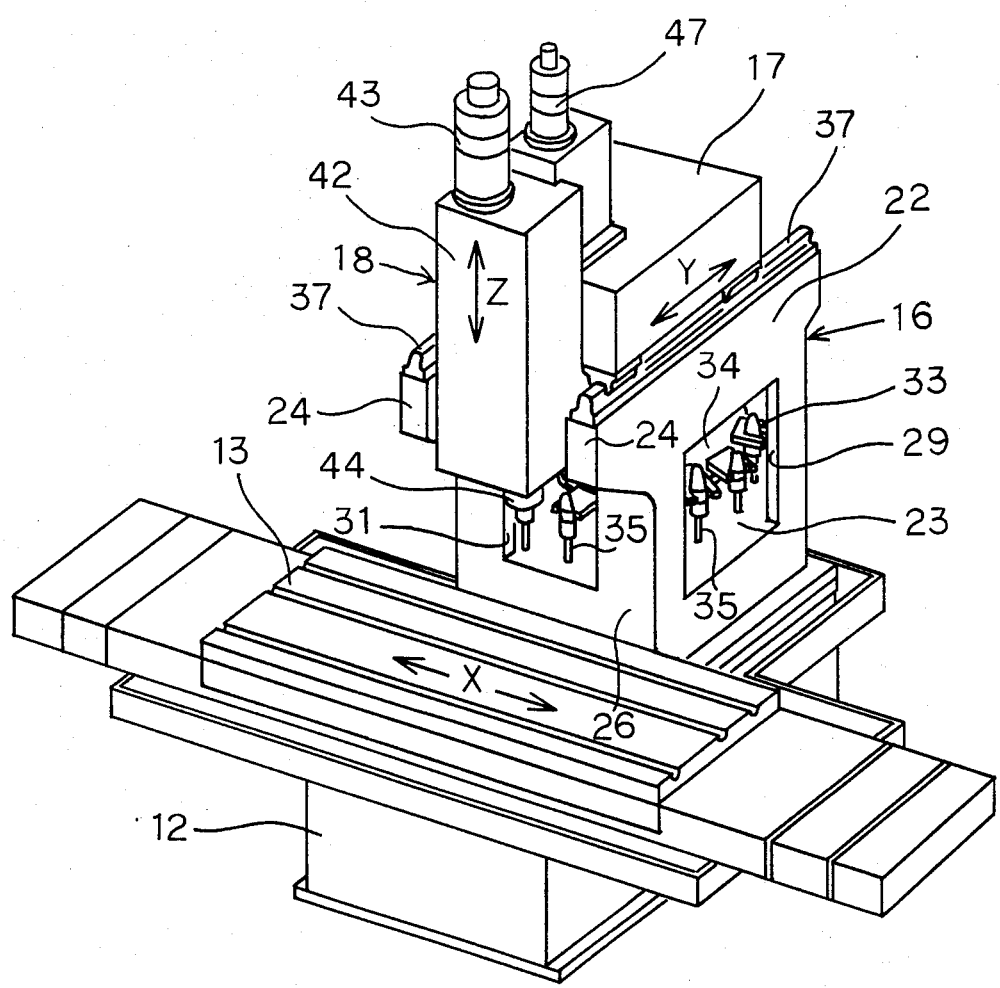
FIG. 3 is a further perspective, diagrammatic view of the improved machining center illustrated by FIG. 2.
Figure 4:
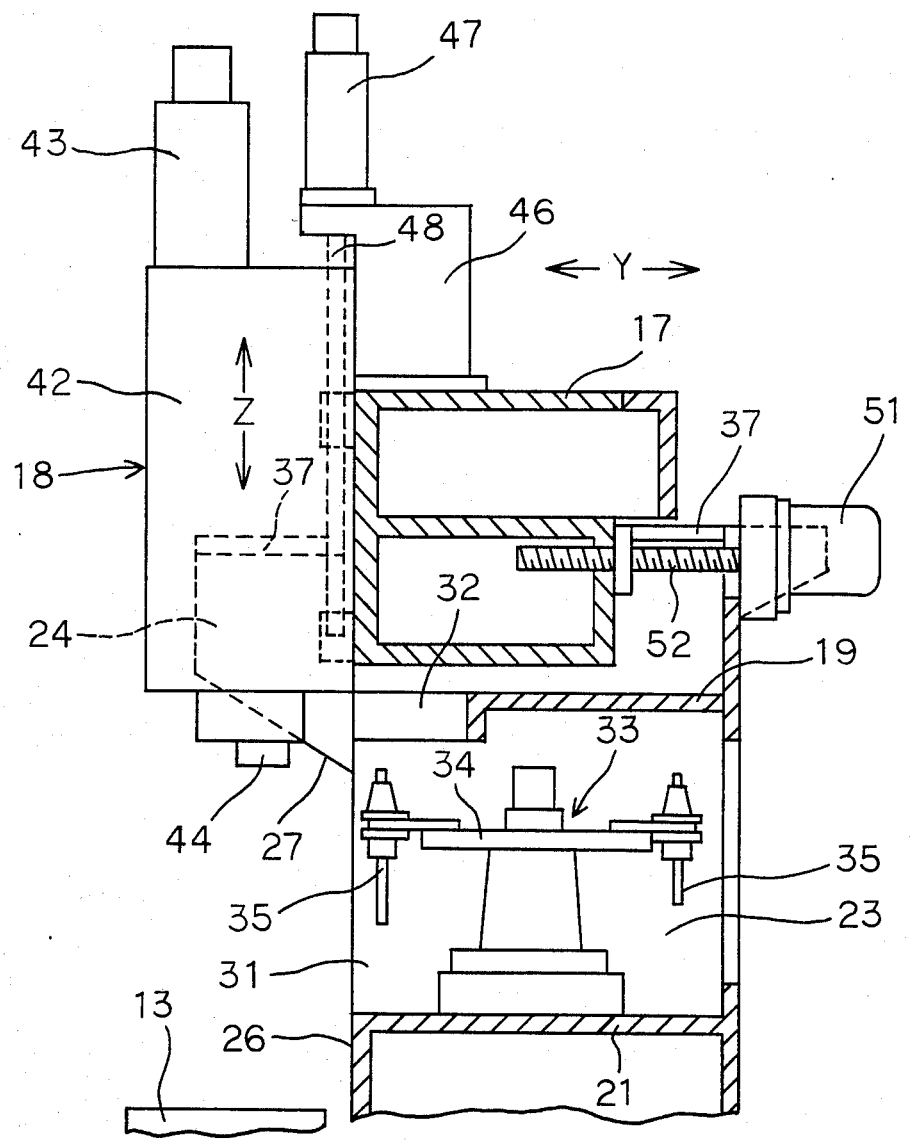
FIG. 4 is a fragmentary cross-sectional view of the machining body.
Figure 5:
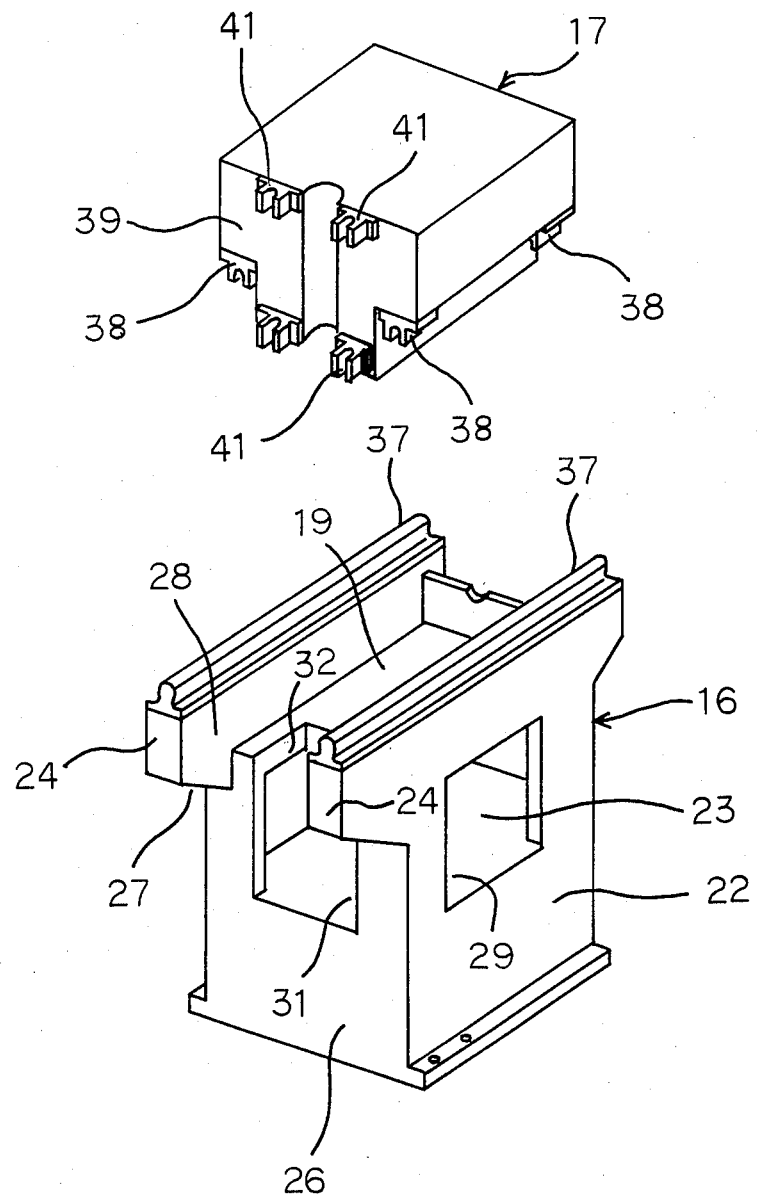
FIG. 5 is an exploded perspective view illustrating the slide and the machining body.

Certain terminology will be used in the following description for convenience in reference only, and will not be limiting. For example, the words "upwardly", "downwardly", "rightwardly" and "leftwardly" will refer to directions in the drawings to which reference is made. The word "front" will conventionally refer to the side of the machining center having the table positioned thereadjacent, this front side being illustrated in FIG. 3, and the word "rear" will refer to the opposite end of the machining center, namely the rightward end in FIG. 4. The words "inwardly" and "outwardly" will refer to directions toward and away from, respectively, the geometric center of the machining center and designated parts thereof. Said terminology will include the words specifically mentioned, derivatives thereof, and words of similar import.

DETAILED DESCRIPTION

Referring to FIGS. 2-5, there is illustrated the improved machining center 10 according to the present invention. This machining center includes a housing or body 11 having a front portion 12 which supports thereon a conventional table 13 which is linearly movable in a reciprocal manner along the horizontal direction X. This table 13 conventionally mounts thereon a workpiece which is to be machined. The body 11 also has a rear portion 16 which is disposed adjacent the rear side of the table and projects upwardly. A top slide 17 is reciprocally slidably mounted on top of the rear body portion 16 for slidable displacement along the horizontal direction Y, which direction extends perpendicular with respect to the direction X. This top slide 16 in turn mounts thereon a tool spindle head assembly 18, the latter being positionable over the table 13 and being vertically movable along the direction Z.

The rear body portion 16 is, according to the present invention, of a boxlike structure which includes top and bottom walls 19 and 21, respectively, and a pair of substantially parallel sidewalls 22, which sidewalls project perpendicularly away from the rear side of the table 13. The rear body portion 16 defines therein a rather large interior chamber or space 23 as defined between these latter-mentioned walls. The sidewalls 22 also have, adjacent their upper ends, elongate protrusions or extensions 24 which project forwardly beyond the front wall 26 of the rear body portion, whereby these protrusions 24 overhang and are spaced upwardly from the table 13. These protrusions 24 preferably have the lower surfaces 27 thereof which slope downwardly as they project rearwardly toward the front wall 26 whereby the protrusions hence have a tapered cross section which increases in area as they project rearwardly for connection with the main portions of the sidewalls.

The protrusions 24 associated with the sidewalls 22 are sidewardly spaced a substantial distance apart so as to define therebetween a substantially rectangular slot or recess 28 which projects vertically downwardly between the protrusions 24 adjacent the front wall 26, which recess 28 also opens outwardly (that is, forwardly) between the outer free ends of the protrusions.

The boxlike body portion 16 preferably has substantially rectangular windowlike openings 29 which are formed in the sidewalls 22 so as to provide access to the interior chamber 23. The front wall 26 also has a large and substantially rectangular access opening or gate 31 formed therethrough for communication with the interior chamber 23, which access opening 31 effectively comprises an enlarged slot which extends the full width between the sidewalls 22, with this access opening 31 projecting upwardly from the bottom wall 21 through the top wall 19. A portion of this top wall 19 is removed so as to define a top access opening 32 which is continuous with the front access opening 31.

The interior chamber 23 mounts therein a conventional tool exchange and storage system 33 which may assume any one of many conventional shapes. The tool storage and exchange system 33 is, in the illustrated embodiment, formed as a conventional turntable 34 which is rotatable about a vertical axis, the turntable having forklike support arms spaced around the periphery thereof to permit a plurality of conventional tools 35 to be removably mounted thereon. This turntable 34 is substantially centrally positioned within the rear body portion so that the periphery of the table, and the tools thereon, hence move through an arc which passes closely adjacent the front of the rear body portion, and hence the tools are thus readily accessible through the front access opening 31.

The upper surfaces 36 of the sidewalls 22 define thereon elongated guide rails 37 which extend in the Y direction. These guide rails 37 slidably support grooved guides or bearings 38 which are mounted on the underside of the top slide 17, such as adjacent the lower corners thereof. This slidable guide or bearing arrangement can, however, be reversed so that the grooved guides are on the sidewalls and the elongated rails on the underside of the top slide if desired.

The front face 39 of the top slide 17 also has a plurality of grooved guides 41 thereon, such as adjacent the corners thereof. These grooved guides 41 cooperate with vertically elongated guide rails (not shown) secured to the rear of the tool spindle slide 42 so as to enable the tool spindle head assembly 18 to slidably vertically reciprocate along the Z direction. The head assembly 18 includes a drive motor 43 which is mounted on the slide 42 and is rotatably drivingly coupled to the spindle 44, which spindle is used for engagement with the selected tool 35.

The top slide 17 has a support portion 46 which is fixed to and projects upwardly from the front end thereof, which support portion mounts thereon a drive motor 47 for controlling the vertical reciprocation of the head assembly 18. This drive motor 47 can drivingly control the spindle using any conventional mechanism, such as by means of a conventional rotary drive screw 48 which is engaged with the slide 42.

The slidable displacement of the top slide 17 along the direction Y is similarly controlled by a drive motor 51 which is mounted on the rear housing portion 16 and is drivingly connected thereto, as by an elongated rotatable drive screw 52.

Figure 7:
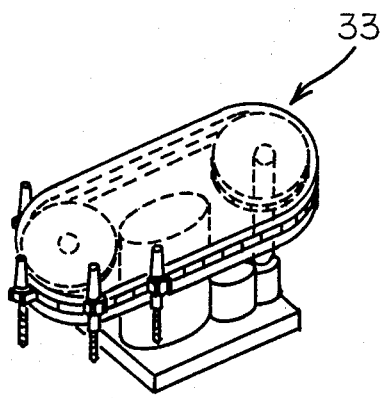
FIG. 7 illustrates an alternate tool exchange and storage device.

While FIGS. 2-5 illustrate a tool exchange and storage system 33 employing a rotary turntable, nevertheless other types of such storage systems can be used, and reference is made to FIG. 7 which illustrates one such variation. In this possible variation, the tool exchange and storage system comprises an elongated endless support belt extending around an elongate guide plate and supported on a pair of horizontally spaced sprockets, one of which is rotatably driven. This endless chain has a plurality of forklike arms mounted therealong, which arms permit the tools 35 to be removably supported thereon.

Figure 1:
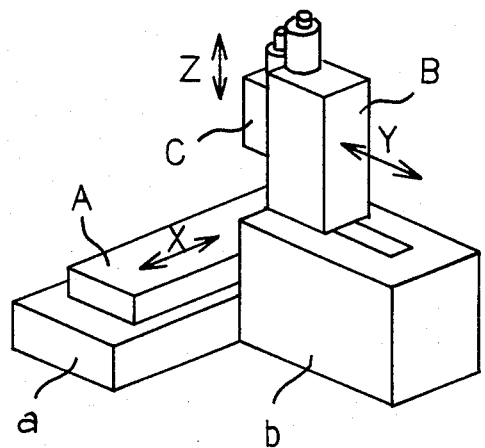
FIG. 1 is a perspective, diagrammatic view of a conventional machining center of the column type.
Figure 2:
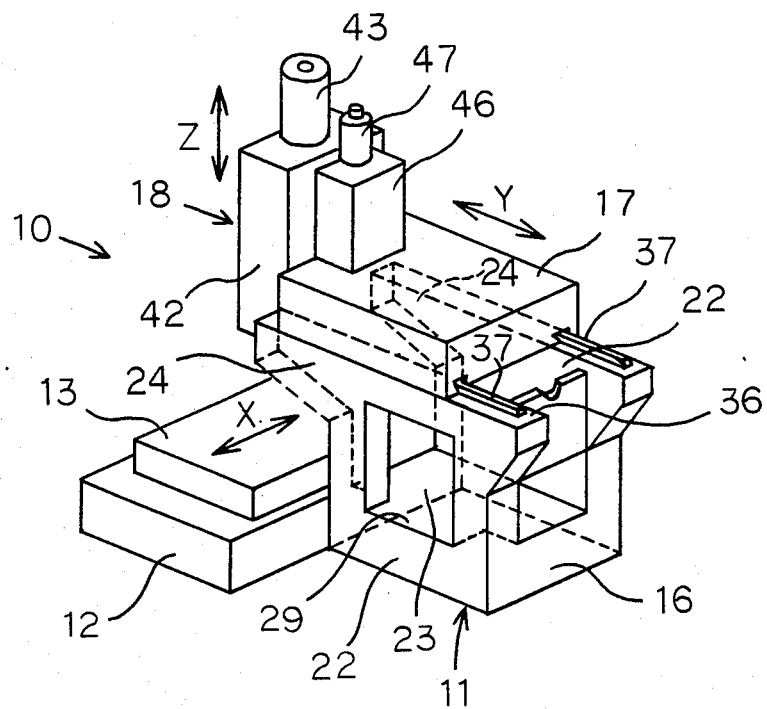
FIG. 2 is a perspective, diagrammatic view of a preferred embodiment of the improved machining center according to this invention.

The advantageous structure of the present invention as embodied by the embodiment of FIGS. 2-5 will now be described with reference to FIG. 6B, and will be compared to the conventional structure of FIG. 1 with reference to FIG. 6A.

Figure 6A:
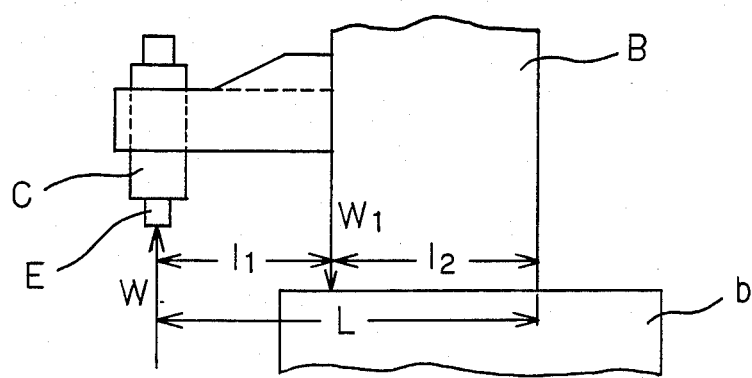
FIG. 6A diagrammatically illustrates the forces imposed on the conventional machining center of FIG. 1.

Referring to FIG. 6A, the conventional machining center has the spindle head assembly C projecting outwardly in a cantilever fashion from the machine column B. The length of this cantilever beam which is, in effect, the distance between the centerline of the spindle E and the front wall of the column B is designated $l_1$. A cutting thrust force W is imposed upwardly against the tool spindle, and this results in creation of a counter force $W_1$ which resists the cutting thrust force and is created substantially adjacent the front face of the column in the vicinity of the bottom thereof due to its slidable connection to the machine body. The distance from the centerline of the spindle to the back wall of the machine column B is designated L. Under these circumstances, the counter force $W_1$ which is created during cutting is determined by the following formula:

$$W_1 = \frac{WL}{l_2}$$

Figure 6B:
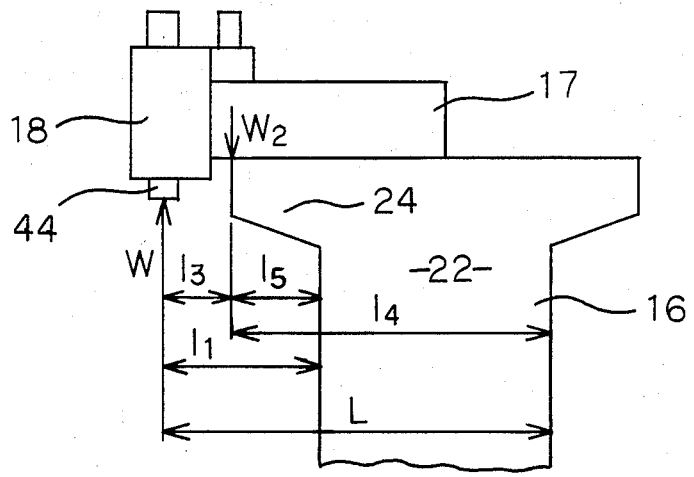
FIG. 6B illustrates the same forces when imposed on the improved machining center illustrated by FIGS. 2-5.

In contrast, in the present invention as diagrammatically illustrated in FIG. 6B, and assuming that the lengths $l_1$ and L in FIG. 6B are identical to the respective designations in FIG. 6A, then the counterforce $W_2$ in the machining center of this invention is determined by the following formula:

$$W_2 = \frac{WL}{l_4}$$

The above results from the fact that the counter force $W_2$ is no longer disposed in the same plane as the front face of the column, but rather is disposed adjacent the front ends of the protruding portions of the sidewall, which front ends are disposed outwardly at least partially over the table. Hence, the counter force $W_2$ in the machining center of this invention, in comparison to the counter force $W_1$ of the conventional machining center, possesses the following ratio:

$$\frac{W_2}{W_1} = \frac{\frac{WL}{l_4}}{\frac{WL}{l_2}} = \frac{l_2}{l_4} = \frac{L - l_1}{L - l_3} = \frac{L - (l_3 + l_1)}{L - l_3} < 1$$

Thus, the counter force $W_2$ is at the ends of the protrusions 24 in the machining center of this invention and hence is reduced in proportion to the extended length of the protrusions 24, namely in proportion to the length $l_5$.

Thus, the machine body 16 of the present invention can be built of significantly less weight, but with high rigidity so as to provide precise machining performance. Also, the sliding top head can be of lighter weight than of the conventional type. The feeding device for moving the head along the Y axis can also be of a more simple structure. The guide rails on the upper surface of the machine body are also located at a higher elevation than where the tool normally engaged the workpiece, so that cutting chips are not apt to contact the guide rails.

Since the tool exchange and storage apparatus is disposed within the interior chamber of the housing and is accessible through the front access opening, the tools can be inserted into or released from the respective support forks by movement along the respective radial slot. The tool spindle can hence move rearwardly into the empty space through the front access opening so as to permit the spindle axis to be disposed directly over the selected tool, whereupon the spindle can be moved to either engage or release the tool.

Figure 8:
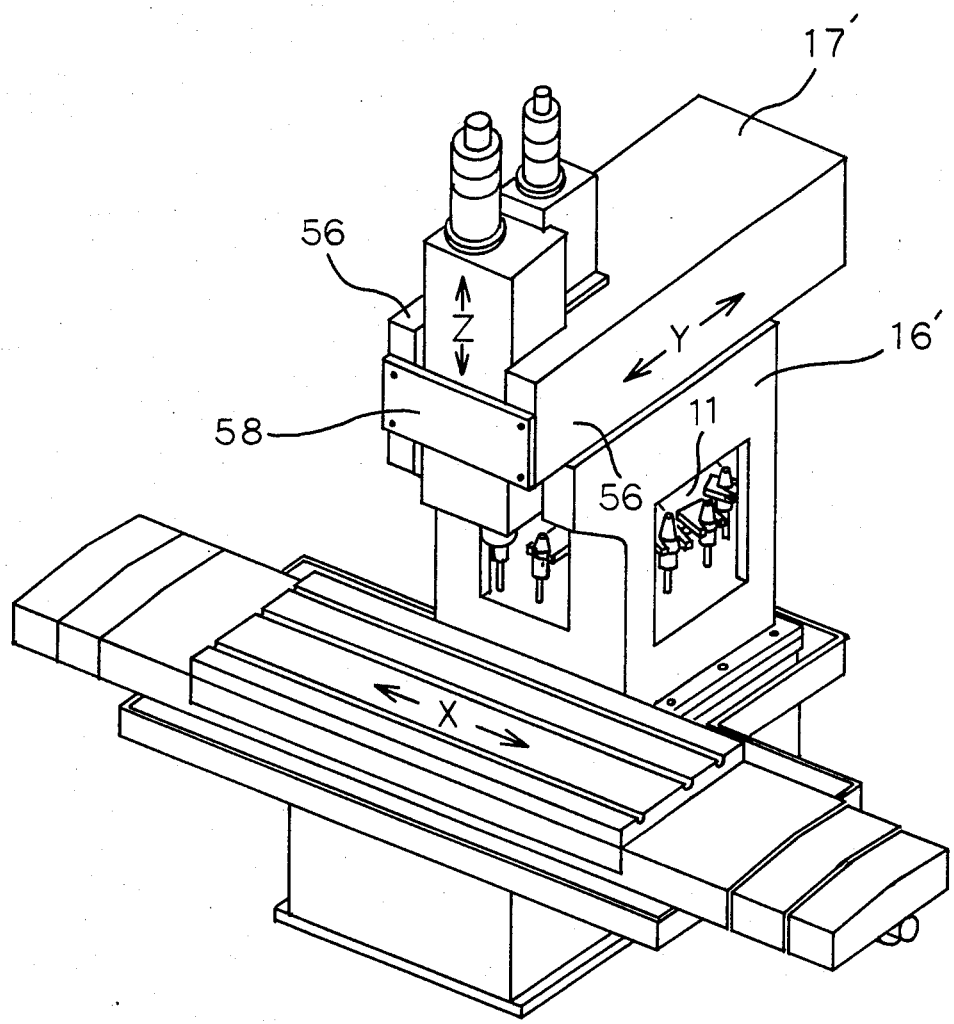
FIGS. 8 and 9 respectively correspond to FIGS. 3 and 5 but illustrate a variation of the invention.
Figure 9:
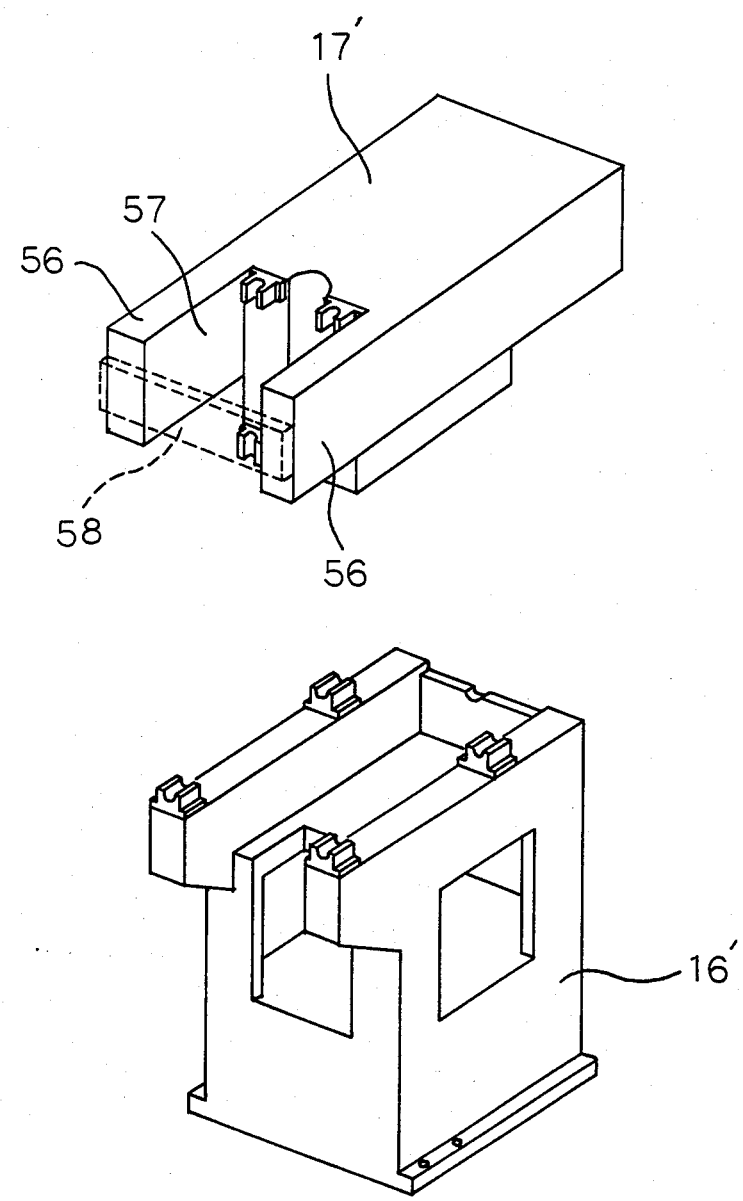

The present invention may also be modified as illustrated by the embodiment of FIGS. 8-9. The structure of the machining center illustrated by these latter figures is identical to that of FIGS. 2-5 except that the top slide has a pair of substantially parallel side plates 56 which project forwardly from the front surface, which side plates define therebetween a downwardly extending slot 57 which accommodates therein the vertically movable top spindle head assembly. These side plates 56 can be rigidly joined together adjacent the front free ends thereof by means of a cross plate 58 being bolted thereto.

In the present invention, the side plates 22 having the protrusions 24 thereon are preferably integrally formed in one piece, such as by molding or being cut from a single piece of thick plate.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. A machining center comprising:
   a stationary table support;
   a work table supported on said table support for movement within a substantially horizontal plane, said work table defining thereon an upper surface adapted for positioning of a workpiece;
   a boxlike body stationarily positioned adjacent one side of said work table, said boxlike body defining therein an interior chamber disposed at an elvation above the upper surface of the work table, said boxlike body including a pair of upright sidewalls which project upwardly a substantial distance above the upper surface of said work table and define said interior chamber therebetween, said sidewalls projecting transversely away from the work table;
   tool exchange and supporting means movably positioned wholly within said interior chamber at an elevation above the upper surface of said work table, said means including a support movable along a path and adapted to have a plurality of tools stored thereon in spaced relationship along said path;
   said boxlike body having an upright front wall disposed closely adjacent said one side of said work table and projecting upwardly above said upper surface, said front wall having a gatelike opening extending therethrough for direct communication with said interior chamber to provide access to said tool exchange and supporting means, said opening projecting upwardly through an upper edge of said front wall, and said gatelike opening being disposed at an elevation above the upper surface of said work table;
   each said sidewall ahving an elongated, cantilevered, protruding wall portion which projects forwardly beyond said front wall at an elevation substantially above said upper surface so as to directly overhang and be vertically spaced upwardly from the upper surface of said work table, said protruding wall portion being fixedly associated with its respective said sidewall, and the protruding wall portions of said sidewalls being sidewardly spaced apart and defining a slotlike region which opens downwardly therebetween, said slotlike region being in communication with said gatelike opening;
   slide means slidably supported on said boxlike body structure above said interior chamber for linear slidable displacement along a substantially horizontal direction which substantially perpendicularly intersects said front wall, said slide means and said boxlike body structure having opposed bearing means thereon for supporting said slide means for movement along said horizontal direction, said bearing means including opposed portions which cooperate between said slide means and the protruding wall portions adjacent the outer free ends thereof;

said sidewalls and the respective protruding wall portions defining thereon upper edges which are disposed at an elevation substantially above said upper surface and above said interior chamber, said upper edges projecting substantially along said horizontal direction, said bearing means which cooperate between said slide means and said sidewalls being positioned substantially along said upper edges;

tool-supporting spindle head means slidably supported on said slide means adjacent a front face thereof for linear reciprocal movement along a substantially vertical axis, said spindle head means being disposed so as to project vertically downwardly between the protruding wall portions of said sidewalls for access to a workpiece mounted on said work table, said spindle head means being movable rearwardly along said horizontal direction in response to rearward movement of said slide means so that said spindle head means can pass through said gatelike opening for access to said tool exchange and supporting means.

2. A machining center according to claim 1, wherein each said protruding wall portion has a lower surface which is disposed upwardly from the work table and which slopes downwardly as it projects rearwardly toward the front wall of the body so that the protruding wall portion has a variable and increasing cross section as it projects rearwardly from the free end thereof toward said front wall.

3. A machining center according to claim 2, wherein the protruding wall portions define a yokelike structure for accommodating the spindle head means within the downwardly opening slotlike region defined between the spaced protruding wall portions, said protruding wall portions being free at their outer ends so that said slotlike region opens horizontally forwardly between said outer ends.

4. A machining center according to claim 1, wherein said boxlike body incudes a top wall which overlies said interior chamber and is fixedly joined to said pair of upright sidewalls, said top wall being spaced downwardly from the upper edges of said sidewalls so that said bearing means are disposed upwardly from said top wall, said top wall having an access opening formed therethrough for communication with said interior chamber, said access opening projecting rearwardly of said top wall from a front edge thereof so that said access opening is in open communication with said gatelike opening of said front wall for permitting the spindle head means to be moved rearwardly into said interior chamber when interchanging of a tool is desired.

5. A machining center according to cliam 4, wherein at least one of said upright sidewalls has an access opening extending therethrough for communication with the interior chamber to provide access to the tools positioned therein.

6. A machining center according to claim 4, wherein said spindle head means includes a tool spindle slide positioned adjacent the front face of said slide means and projecting downwardly therefrom into the slotlike region defined between said protruding wall portions, said tool spindle slide rotatably supporting thereon a tool-supporting spindle for rotation about a substantially vertical axis, and opposed vertically extending bearing means coacting between the front face of said slide means and said tool spindle slide for permitting the tool spindle slide to be vertically displaced, said opposed bearing means including a pair of substantially parallel and vertically extending guides mounted on the front face of said slide means in sidewardly spaced relation.

* * * * *